Figure 1:
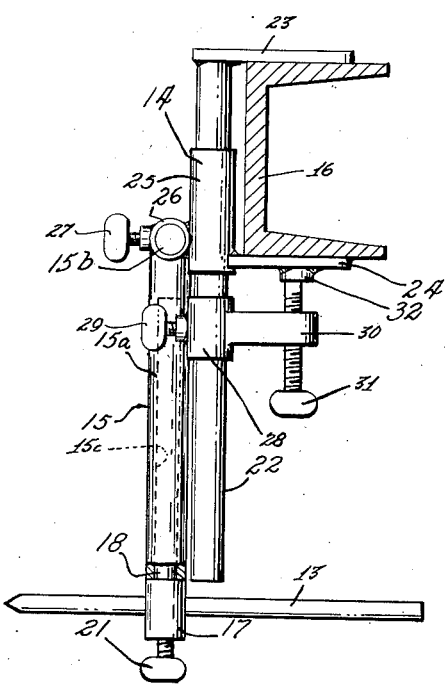

July 9, 1957

G. W. LISKEY 2,798,296

MOTOR VEHICLE FRAME GAUGE

Filed Nov. 23, 1953

3 Sheets-Sheet 1

INVENTOR.
George W. Liskey

BY
*Struhlwells*
Atty.

July 9, 1957 G. W. LISKEY 2,798,296
MOTOR VEHICLE FRAME GAUGE
Filed Nov. 23, 1953 3 Sheets-Sheet 2

INVENTOR.
George W. Liskey
BY
Strahl Wells
Atty

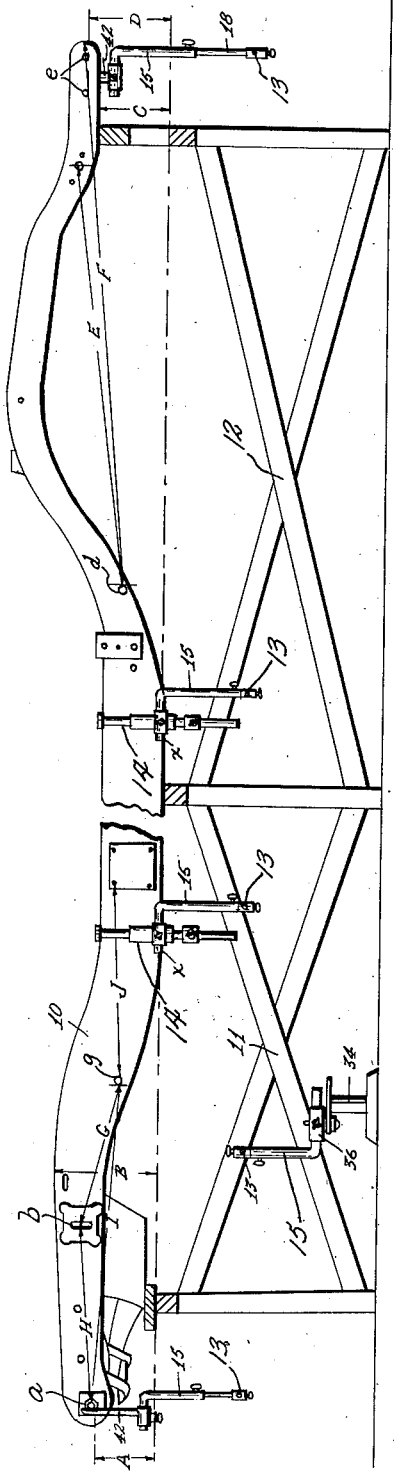

United States Patent Office 2,798,296
Patented July 9, 1957

2,798,296
MOTOR VEHICLE FRAME GAUGE
George W. Liskey, Spokane, Wash.
Application November 23, 1953, Serial No. 393,535
2 Claims. (Cl. 33—46)

It is the principal purpose of my invention to provide a new and simplified mechanism for supporting sighting devices, such as pins, in making various measurements to check the shapes of motor vehicle frames while the bodies are on the frames. In particular, my invention is specifically directed to a mechanism which is utilized in establishing a check line below and substantially parallel to the vehicle frame and in determining accurately by comparison with the check line whether any of several critical points on the frame have been distorted up or down. These distortions can be found without the necessity of removing the body from the frame. Their discovery often explains many misfits that appear in the body.

Modern motor vehicle frames are changed in size and shape frequently. The different automobile manufacturers use their own particular designs of frames. It is necessary, therefore, in order to check the shape of a given motor frame for any distortion from the original or correct shape, to have before you the relations of certain critical points on a correct frame for comparison purposes. These relations can well be shown on a work sheet having a plan and a side view of the particular frame, by indications on the view of the check points and by showing in a chart on the work sheet the point to point measurements. It is comparatively easy to determine horizontal deviations from the correct frame shape while the car body is in place by making simple measurements along the frame bottom face. However, to check the vertical positions of the various critical points, it is necessary to resort to some means of checking which is keyed to a datum line at or below the main lower portion of the frame. The frame is pretty well exposed when viewed from the bottom, but with a body and motor etc. on it, the frame cannot readily be viewed from the sides. When the frame is studied it becomes evident that to check the positions vertically, of the several critical points, some supporting means is needed that will universally adapt itself to the many variations found in frames. The device must be readily attachable to any check point on the frame. Adjustability is necessary too.

My invention contemplates the provision of a simple supporting mechanism for a sighting pin, that is composed of a minimum number of parts to provide for ready attachment to a variety of mounting clamps and to provide three dimensional shifting of the pin with respect to the point being checked on the frame.

In order that my invention and its advantages may be understood, the following description and the accompanying drawings disclose the preferred form of my invention together with sufficient information to enable others, who are skilled in the art of checking motor vehicles frames, to practice my invention. Various changes may hereafter be made in the detailed construction and in the use of my invention. It is clear therefore that my invention is not limited to the exact details shown and described, but is intended to cover equivalent parts that fall within the scope of the claims.

Figure 2:
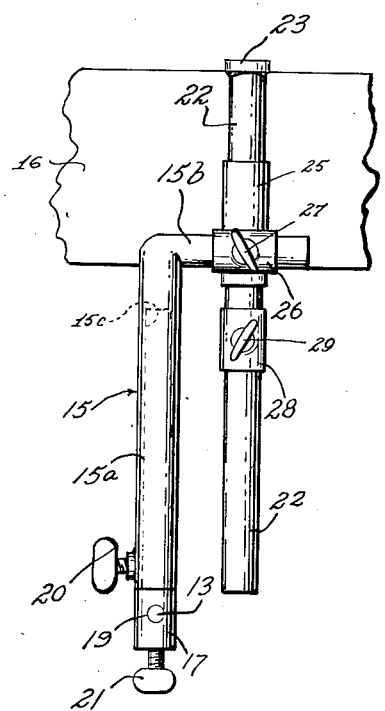
Figure 3:
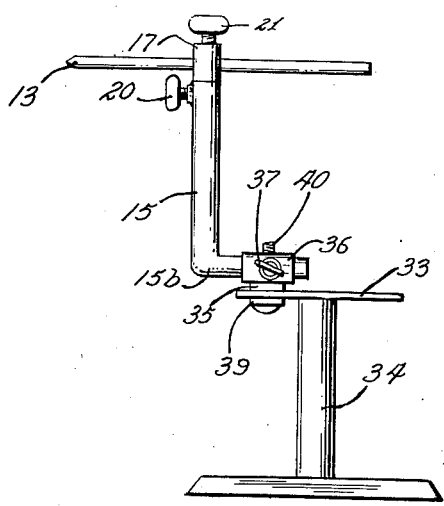
Figure 4:
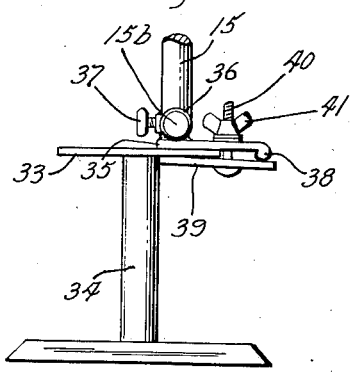
Figure 5:
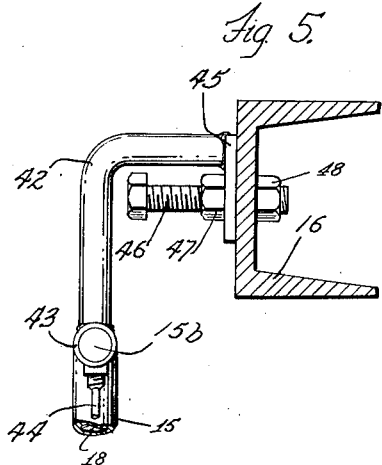
Figure 6:
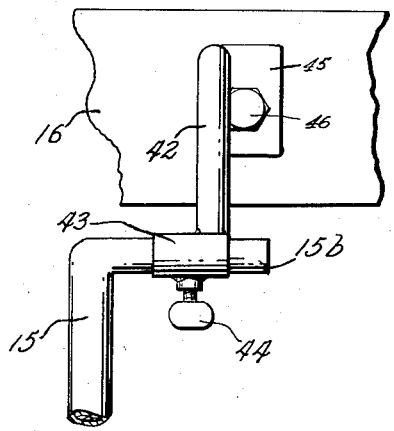
Figure 7:
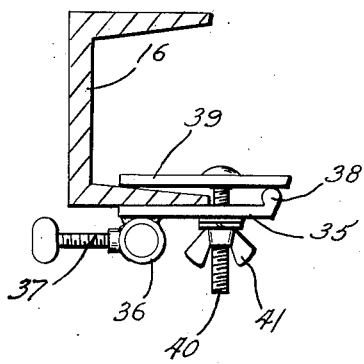
Figure 8:
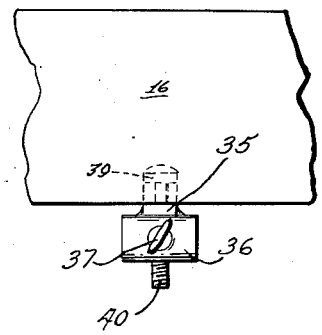

In the drawings:
Figure 1 is a side view of a frame gauge embodying my invention, showing my sighting pin support as particularly adapted for securement to a channel section frame of a vehicle;
Figure 2 is a side view of the gauge as viewed from the left of Figure 1;
Figure 3 is a side view showing the sighting pin support with a stand;
Figure 4 is a view looking at Figure 3 from the right, part of the support being broken away;
Figures 5 and 6 illustrate a mounting attachment for the sighting pin support which is utilized where bolt holes in the frame can be utilized;
Figures 7 and 8 illustrate the mounting attachment of Figures 3 and 4 used to suspend the pin support from a frame.
Figure 9 is a side view of a motor vehicle frame with parts broken away, showing how my invention is used; and
Figure 10 is a bottom plan view of the frame.

Referring now in detail to the drawings and in particular to Figures 9 and 10, there are indicated on a motor vehicle frame 10, certain critical distances from point to point or line to point, by utilizing letter designations. These distances for example are:

A. 8⅛ in. Lower edge front bumper hole $a$ to datum line.
B. 12⅛ in. Top edge of frame to datum line.
C. 6⅛ in. Lower edge of frame to datum line.
D. 7⅛ in. Lower edge either rear bumper hole $e$ to datum line.
E. 45½ in. Edge of hole $d$ to center top spring shackle pin.
F. 53⅜ in. Edge of hole $d$ to extreme rear of frame rail.
G. 16½ in. Elongated hole $b$ to hole $g$.
H. 18¾ in. Elongated hole $b$ to hole $a$.
I. 34½ in. Hole $a$ to hole $g$.
J. 20 in. Edge of hole $g$ to center front top rivet on body support.
K. 28¾ in. Std. transmission, to front edge engine support member.
L. 36¾ in. Hydra. transmission, to either hole $c$ in the bottom engine support.
N. 30¾ in. Elongated hole $b$ to outside upper control arm rubber bumper support.
X. Two points to mount datum gauges, all height dimensions given in relation to these two equal points.

It will be noted that the distances A to D are vertical distances from a datum line X—X that has to be established. The distances E to N are readily measured in the usual way because they are along visible accessible paths at the bottom of the frame. The vehicles are usually supported on some kind of work frame such as is indicated at 11—12 in Figure 9. It is possible to get beneath the frame 10 and make such measurements as those described under E to N above. These measurements will usually determine any lateral distortion of the frame.

In order to determine the vertical distance A to D and such others as may be found necessary on different frames, it is evident that, for each frame side rail, a datum line must be selected and this datum line preferably will be taken as a straight line between two points X—X on the flat mid portion of the frame 10. The work sheet measurements A—D given hereinbefore are the measurements that are found on an undistorted frame of the shape shown, from the datum line to the points indicated. It is impossible in most instances to measure or sight along the datum line because the suspended parts of the car will be in the way. Two sighting pins 13 are suspended equal distances from the points X—X and they establish a sight line beneath a side rail of the frame.

Now by properly suspending other sighting pins 13 at the points A to D, one can determine the deviation, if any, of these points from the correct level.

My supporting means 15 for the sighting pins 13 is best shown in Figures 1 and 2 of the drawings where it is mounted by a mounting clamp 14 on a frame piece 16 such as a side rail on the frame 10. The supporting means 15 comprises a main bar portion 15a, at one end of which I provide a reduced pivot pin 15b. The pin 15b is accurately positioned at right angles to the portion 15a and is circular in cross section. The portion 15a has a recess 15c extending lengthwise into it from the end opposite the pin 15b. This recess is circular in cross section and is of substantial length. A pin holder 17 has a shank portion 18 which is slidably and rotatably fitted in the recess 15c. The pin holder 17 also has an aperature 19 extending at right angles to the shank 18 for receiving the sighting pin 13. A screw 20 is threaded into the portion 15a close to the recessed end to lock the shank 18 at any desired level in the recess 15a. The pin holder 17 is threaded to receive a screw 21 which is used to lock the pin 13 in place.

This particular supporting means 15, although it is very simple in construction, provides the three dimensional adjustment necessary for the sighting pins 13. The length of the pivot pin 15b provides for horizontal shifting of the bar portion 15a and for angular positioning of it. The pin 15b can be set in an aperture and turned until the part 15a is in a vertical plane including the axis of the pin 15b. The sighting pin 13 is always at right angles to the lengthwise axis of the car and the sighting pin 13 is checked with a level to see that it is in a horizontal plane. Vertical adjustment of the sighting pin can be accomplished by loosening the screw 20 and raising or lowering the holder 17. The screw 21 provides a means of controlling the extent the pin 13 will extend along its own axis from the portion 15a. The capacity of the supporting means 15 to provide the necessary adjustments for the pin 13 makes it possible to use this one assembly in combination with a variety of mounting devices to place the sighting pins 13 at the desired points for making the checks necessary as hereinbefore outlined.

One of the mounting means used with the sighting pin support 15 is that shown at 14 in Figures 1 and 2. This device comprises an elongated cylindrical stem 22 which has a flat bar 23 at one end. Another flat bar 24 has a sleeve 25 sliding on the stem 22 and is provided with a transverse sleeve 26 which is adapted to pivotally mount the portion 15b of the support 15. A set screw 27 is provided in the sleeve 26. In order to hold the two bars 23 and 24 clamped to a frame piece such as 16, a sleeve 28 is mounted on the stem 22 and carries a set screw 29 by which it can be fixed to the stem 22. The sleeve 28 also carries a lateral bar 30 which is threaded to receive a jack screw 31. The bar 24 has a cup 32 to receive the end of the jack screw 31. The sleeve 25 is free to move against the lower flange of the frame member 16 and it is clamped rigidly in place by means of the jack screw 31. The distance from the lower face of the flange of the member 16 to the sighting pin 13 is the distance from the pivot pin 15b to the sighting pin 13 because the top face of the bar 24 is aligned with the lowermost surface of the pin 15b when the pin 15b is mounted in the sleeve 26.

In Figures 3 and 4 of the drawings, I have shown a mechanism by which the support 15 can be clamped to a simple flat plate such as the top plate 33 of a floor stand 34. This clamping means comprises a bar 35 which has a sleeve 36 thereon adapted to receive the pin 15b of the support 15. A set screw 37 is used to clamp the pin 15b in place. The bar 35 has an offset rounded ledge 38 at the end opposite the sleeve 36, the ledge extending parallel to the sleeve 36. A clamp bar 39 rides on the ledge 38 and is clamped to the bar 35 by a bolt 40 and a wing nut 41.

Figures 7 and 8 illustrate how the mechanism just described can also be utilized to clamp the support 15 in place on a channel frame 16.

Figures 5 and 6 illustrate a third mounting means for the support 15 which is adapted for securing the support 15 to frame members by utilizing an aperture in the frame member. This mounting means comprises an L-shaped bar 42 which has a sleeve 43 at one end for receiving the pin 15b. This sleeve has a set screw 44 for locking the pin 15b in position. At the other end of the bar 42 an offset plate 45 is provided. This plate is apertured to receive a bolt 46 which can be utilized to clamp the plate to a frame member 16 by the use of nuts 47 and 48.

In order to explain the particular advantages of my improved frame gauge which consists of the member 15 with its sighting pin 13 and any one of the mounting means hereinbefore described, a typical operation in determining whether a frame point is too high or too low will now be described. Referring to the vehicle frame shown in Figures 9 and 10, the first step in making a measurement to determine whether the frame 10 is straight is to attach two of the supports 15 with their pins 13 at the points X. The mounting means 14 is shown as being used for this purpose so that the pivot pins 15b of the supports 15 are aligned directly with the lower face of the frame 16, which in this case is the side rail of the frame 10. The sighting pins are turned at right angles to the frame side rail 16. A straight line extended through the points X is actually the datum line from which the measurements A to D are taken. The sighting pins 13 are adjusted until they are level. The holder 17 should be adjusted up and down until the sighting pins 13 of the two units are exactly the same number of inches below the side rail 16.

The next step is to mount another support 15 at the point where the measurement is to be checked. If this is at the point A, then the mounting means 42—48 is used to secure the support 15 in the front bumper hole of the frame 10. The support 15 is adjusted until the sighting pin 13 is level and at right angles to the frame side rail. According to the measurement hereinbefore given, the distance from the datum line, that is, a line through the point X to the point at the lower edge of the front bumper hole should be 8⅛ inches vertically. To this distance the operator adds the distance the sighting pin 13 on the first two gauges extend below the datum line. If this later distance were six inches, then the total distance should be 14⅛ inches. The holder 17 of the support 15 is now released and adjusted until the sighting pin 13 carried by this support, is exactly 14⅛ inches below the bolt 46. If the frame height at the point A is correct, the three sighting pins of the three gauges will now be in perfect alignment. If they are not in alignment, the amount of misalignment is measured by adjusting the sighting pin at point A up or down by means of the support 15 and the holder 17 until the pins are aligned. The difference between the distance from the pin 46 to the sighting pin 13 and 14⅛ inches will be the amount of the misalignment.

It is believed to be evident from the foregoing description that my improved support 15, when combined with any suitable mounting means and with the little sighting pins, will provide all the adjustments necessary to measure vertical misalignment of any part of the frame 10 with respect to any other part taken as a datum line.

Having thus described my invention, I claim:

1. In a mechanism for checking the shape of a motor vehicle frame and the like, a supporting means for supporting sighting pins comprising a straight main bar, a pivot pin at one end of the bar, integral with the bar, and extending at right angles to the bar, the bar having a socket extending axially thereof from the other end toward the pivot pin, a pin holder having a shank slidably and rotatably fitted in said socket, means on the bar to secure the shank in said socket against movement relative to the bar, said pin holder comprising a head at one end of the shank provided with a pin aperture therethrough at right angles to the shank and intersecting the shank axis, and means to secure a sighting pin in said aperture.

2. In a mechanism for checking the shape of a motor vehicle frame and the like, a supporting means for supporting sighting pins comprising a straight main bar, a pivot pin at one end of the bar, integral with the bar, and extending at right angles to the bar, the bar having a socket extending axially thereof from the other end toward the pivot pin, a pin holder having a shank slidably and rotatably fitted in said socket, means on the bar to secure the shank in said socket against movement relative to the bar, a sighting pin secured to said holder and extending therefrom at right angles to the shank, a clamp having a sleeve pivotally and slidably receiving the pivot pin for suspending the bar and the sighting pin and means on the sleeve to secure the pivot pin thereto.

References Cited in the file of this patent

UNITED STATES PATENTS

| | | |
|---|---|---|
| 355,911 | Bartow | Jan. 11, 1887 |
| 665,398 | Broadbooks | Jan 8, 1901 |
| 685,455 | Kinkead | Oct. 29, 1901 |
| 1,801,469 | Wagner | Apr. 21, 1931 |
| 1,811,494 | Conway | June 23, 1931 |
| 1,908,136 | Fox | May 9, 1933 |
| 2,000,866 | Smith | May 7, 1935 |
| 2,133,871 | Reed | Oct. 18, 1938 |
| 2,195,893 | McGann | Apr. 2, 1940 |
| 2,218,486 | Storrie | Oct. 15, 1940 |